W. H. THOMAS.
TONGUE TRUCK FOR FARM IMPLEMENTS.
APPLICATION FILED MAR. 22, 1915.
1,248,036.
Patented Nov. 27, 1917.
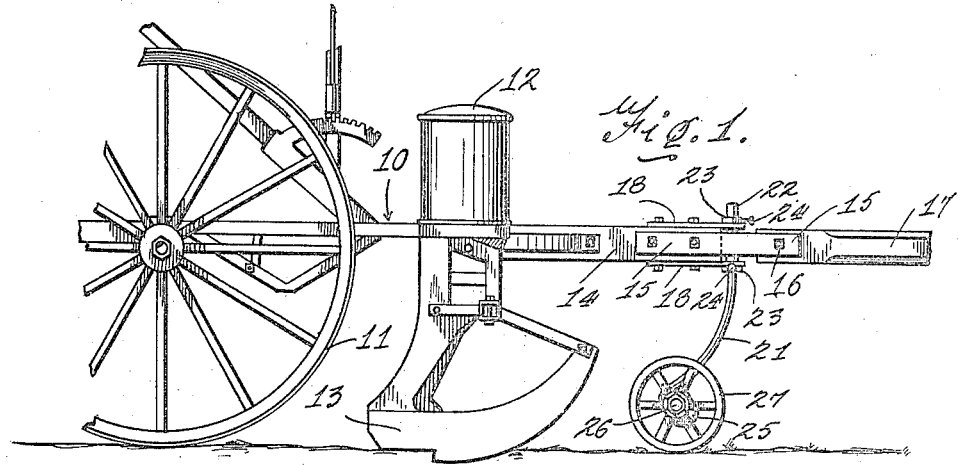
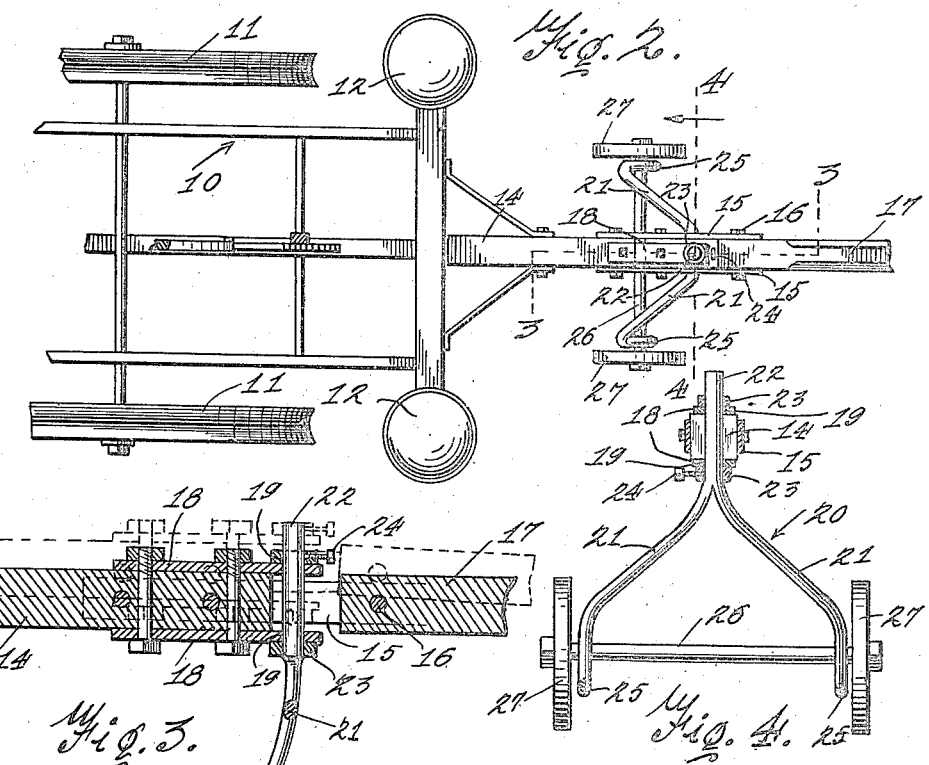

UNITED STATES PATENT OFFICE.

WILLIAM H. THOMAS, OF MILLER, SOUTH DAKOTA.

TONGUE-TRUCK FOR FARM IMPLEMENTS.

1,248,036.　　　　　Specification of Letters Patent.　　Patented Nov. 27, 1917.

Application filed March 22, 1915. Serial No. 16,177.

*To all whom it may concern:*

Be it known that I, WILLIAM H. THOMAS, a citizen of the United States, residing at Miller, in the county of Hand, State of South Dakota, have invented certain new and useful Improvements in Tongue-Trucks for Farm Implements; and I do hereby declare the following to be a full, clear, and exact description of the invention, such as will enable others skilled in the art to which it appertains to make and use the same.

This invention relates to improvements in trucks and more particularly to trucks designed for employment in connection with corn planters or like implements.

An object of the invention resides in the provision of a truck of the above character which may be readily associated with planters of ordinary construction and is adjustable relatively thereto to regulate the depth at which the planting is to be done.

A further object of the invention is to provide a tongue truck for planters in which novel means are embodied to compensate for the various irregularities of the soil, there being thus insured at all times a seed bed of uniform depth.

With the above and other objects of similar nature in view, the invention consists in the construction, combination and arrangement of parts, set forth in and falling within the scope of the appended claim.

In the drawing:—

Figure 1 is a side elevation of the forward portion of a corn planter including a tongue, with the invention associated therewith.

Fig. 2 is a top plan view thereof.

Fig. 3 is a fragmentary sectional view taken on the line 3—3 of Fig. 2.

Fig. 4 is a transverse sectional view taken on the line 4—4 of Fig. 2.

Referring now more particularly to the drawing, there is illustrated the fore portion of a corn planter of conventional type including the frame 10, wheels 11, seed boxes 12 and boots 13, there being employed in lieu of the tongue usually found in such planters, a stub tongue 14 that is fixed to the planter frame and projects forwardly therefrom.

Secured to opposite sides of the stub tongue 14 and extending beyond the free end thereof in spaced parallel relation are a pair of transversely alined plates 15 having engaged therethrough a pivot bolt 16, there being disposed between said plates and mounted for swinging movement upon said bolt, a tongue 17 to which the draft animals are hitched in the usual manner.

Secured to the remaining side of the stub tongue 14 and likewise extending forwardly therebeyond are spaced bracket arms 18, said arms terminating short of the adjacent end of the tongue 17 and being provided with vertically alined openings 19.

Referring now to the truck proper, the same comprises a forked frame 20 including divergent legs 21 and a connecting stem or shank portion 22, the latter being inserted through the openings 19 in the bracket arms and arranged to pivot freely therein during progress of the implement. It is noted that the shank 22 is of sufficient length to permit a relatively wide adjustment with respect to the stub tongue 14, it being slid vertically within the openings 19 and secured by means of stop collars 23, these collars being arranged respectively above and below the bracket arms and held with set screws 24.

The legs 21 of the truck frame are curved similarly from the shank 22 and terminate each in an elongated loop bearing 25, a shaft 26 being loosely engaged through said bearings and provided at each end with a wheel 27. The truck thus forms in effect a caster that readily adapts itself to the direction of travel of the implement, and relieves to a marked extent the strain upon the draft animals.

The adjustable nature of the truck frame not only permits of its application to implements of different heights but further serves to regulate the depth of cut of the boots 13, a relatively deep or shallow seed bed being thus prepared as desired.

Furthermore, by reason of the elongated shaft bearings 25, compensation is made for the various irregularities of the soil over which the implement is drawn, the wheels 27 conforming readily to such irregularities while the shaft rides freely within said bearings, the depth of seed bed being thus in no wise affected and at all times remaining uniform.

What is claimed, is:—

The combination with a wheeled frame and a stub tongue fixed thereon, of a plate secured to each side of the stub tongue and extending forwardly therebeyond, a draft tongue pivoted to swing vertically between the plates and held thereby against lateral movement, bracket arms fixed to the upper and lower faces of and extending forwardly beyond the stub tongue, said arms having vertically alined bearing openings therein, a truck frame mounted to swing relatively to said tongues and including a stem engaged pivotally through said alined bearing openings and downwardly and rearwardly curved legs diverging from the stem and terminating in elongated bearings, a shaft rotatably mounted slidably in said elongated bearings, and ground wheels fixed to said shaft.

In testimony whereof, I affix my signature, in the presence of two witnesses.

WILLIAM H. THOMAS.

Witnesses:
J. M. WILLIAMS,
JOHN T. McMULLEN.

Copies of this patent may be obtained for five cents each, by addressing the "Commissioner of Patents, Washington, D. C."